R. L. FORD.
SEED PLANTER.
APPLICATION FILED SEPT. 13, 1913.

1,250,297.

Patented Dec. 18, 1917.
2 SHEETS—SHEET 1.

Witnesses:
F. W. Hoffmeister
W. D. Loftus

Inventor:
Ralph L. Ford,
By Chas. E. Lord
Atty.

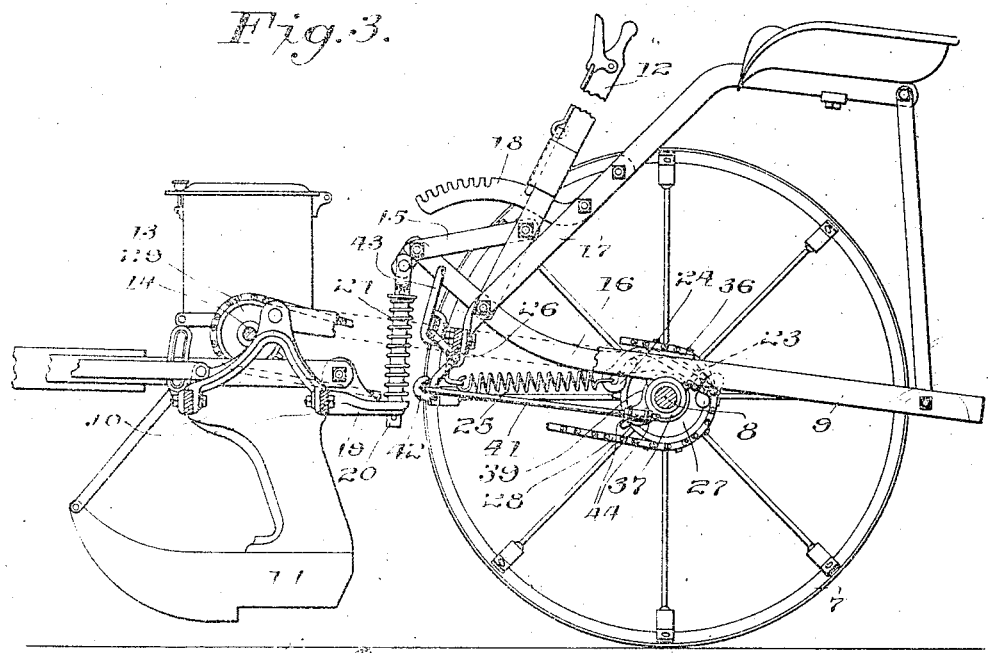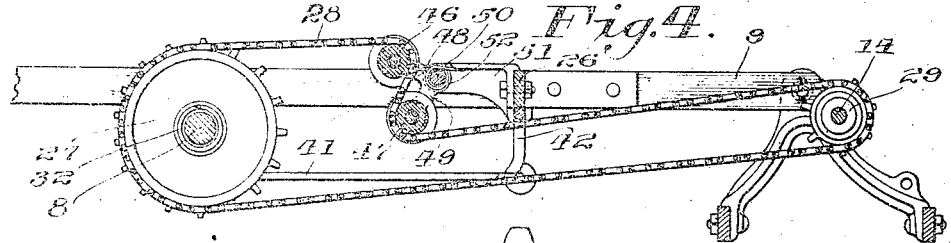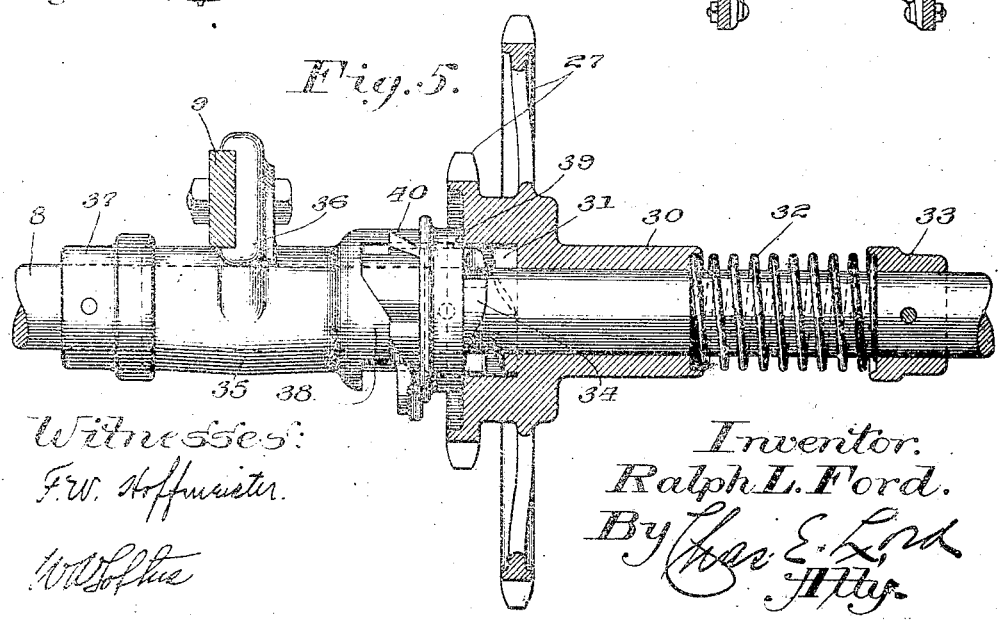

UNITED STATES PATENT OFFICE.

RALPH L. FORD, OF CHICAGO, ILLINOIS, ASSIGNOR TO INTERNATIONAL HARVESTER CORPORATION, A CORPORATION OF NEW JERSEY.

SEED-PLANTER.

1,250,297.

Specification of Letters Patent.

Patented Dec. 18, 1917.

Application filed September 13, 1913. Serial No. 789,700.

*To all whom it may concern:*

Be it known that I, RALPH L. FORD, a citizen of the United States, residing at Chicago, in the county of Cook and State of Illinois, have invented certain new and useful Improvements in Seed-Planters, of which the following is a full, clear, and exact specification.

My invention relates to seed planters.
It is my object to improve and simplify the construction and operation of a device of this class. I accomplish this object by means of an improved driving mechanism, whereby the speed of the seed shaft may be quickly and easily varied without the necessity of manually adjusting the tension of the driving chain or belt; by the employment of automatic means coacting with the driving mechanism and controlled by the raising and lowering of the furrow openers to throw the seed dropping mechanism into and out of operative position; and by the further employment of improved means in connection with the frame adjusting lever of the planter whereby the raising and lowering of the furrow openers is made easy of operation.

One form which my invention may assume is exemplified in the following description and illustrated in the accompanying drawings, in which—

Fig. 3 shows a view similar to that shown in Fig. 2, except that the frames are adjusted to different positions;

Figure 1:
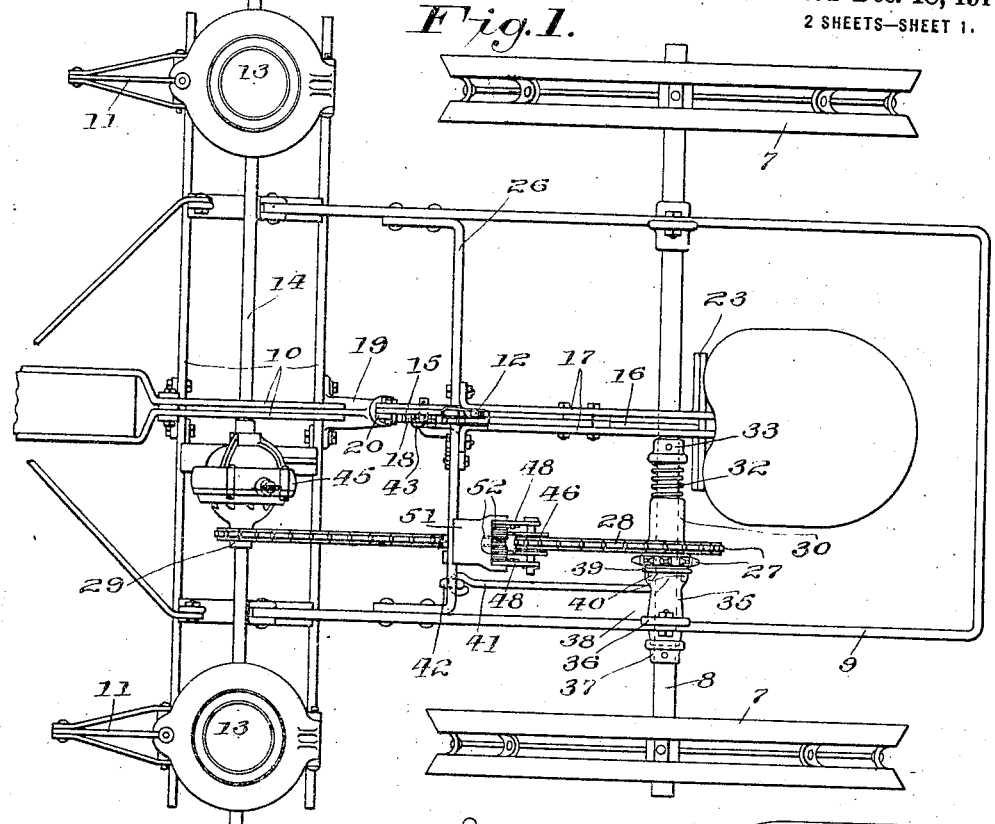
Figure 1 shows a plan view of a corn planter embodying my invention.
Figure 2:
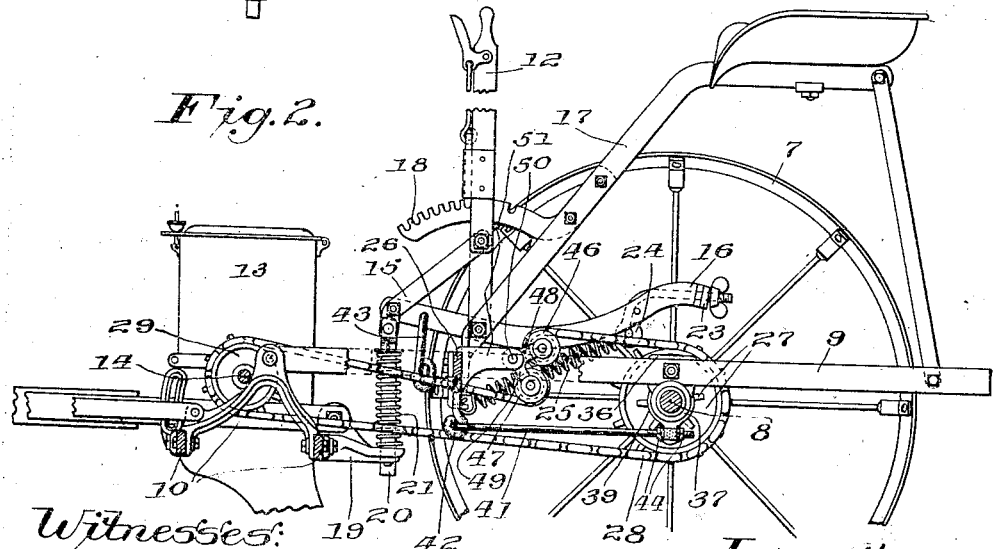
Fig. 2 shows a longitudinal sectional view of a portion of the device shown in Fig. 1.

Fig. 4 shows a detail view of the means employed in my device for tightening the driving chain; and Fig. 5 shows a detail view of the corn planter axle with my improved clutch tripping mechanism applied thereto.
The particular form of planter illustrated herewith comprises carrying wheels 7, an axle 8 having a carrying frame 9 mounted thereon, a furrow opener frame 10 hinged to said main frame, and furrow openers or runners 11. A lever 12 is provided for the purpose of adjusting the depth of the furrow openers and also for elevating them to clear the ground when the planter is being transported from place to place. As is usual in planters of this class, the furrow opener frame carries seed boxes 13 and a seed shaft 14.

The lever 12 is preferably constructed in the form of a double bell crank with a forwardly projecting portion 15 and a rearwardly projecting portion 16. This lever is pivoted near its lower end to the seat standard 17 of the planter and is provided with a sector and detent mechanism 18. The forwardly projecting portion of the lever is connected to a bracket 19 on the furrow opener frame by means of a sliding rod 20 carrying a pressure spring 21. The rear portion 16 of the lever extends to a point a slight distance beyond the axle 8, and at its rear end is provided with a foot receiving member 23 so that both hand and foot power can be applied in the operation of the lever. A link member 24 is secured to the rear end of the portion 16 and is curved to fit over the axle when in its downward position. A contractible coil spring 25 connects the link 24 with a transverse bar 26 on the forward end of the wheel frame at a point near the pivotal point of the double bell crank lever.

Obviously, with the parts just described in position, the spring 25 acts to sustain a portion of the weight of the furrow opener frame and in releasing the lever 12 to permit the furrow openers to drop to the ground, the spring will render the fall less forceful, and in raising the furrow openers a considerable portion of their weight will be counteracted by the tension of the spring. Moreover, with the provision of both hand and foot levers the task of adjusting the relative positions of the two frames is made inconsiderable.

Power is transmitted from the axle of the carrying wheels to the seed shaft by means of the usual sprocket wheel and chain connection, comprising a plurality of driving wheels 27, each of a different diameter to accomplish a varying speed, a sprocket chain 28, and a driven wheel 29.

I have provided for the purpose of automatically throwing the seed shaft out of operative relation with the axle when the furrow openers are raised, and for throwing it into operative relation when the furrow openers are lowered to planting position, the following mechanism:

The drive wheels 27 are preferably formed integral with a sleeve 30 and are carried loosely upon the axle 8. The sleeve is provided at one end with a countersunk clutch face 31 and at its other end engages a pressure spring 32, which spring is held in position upon the axle by means of a fixed collar 33. Adjacent the clutch faced end of the sleeve 30 is a clutch member 34 fixed upon the axle and designed to coact with the clutch face on the sleeve. Abutting the clutch member 34 is a loosely mounted sleeve 35 held against rotation by means of a connection 36 with one side of the frame 9. This sleeve, in addition to other functions, serves as one of the bearing supports for the carrying frame of the planter. A fixed collar 37 abuts the outer end of the sleeve 35 and prevents longitudinal movement thereof. Formed on the periphery of the bearing sleeve 35, a short distance from the inner end thereof, is a beveled cam faced member 38, and between the cam member and the adjacent face of the drive wheels 27 is a collar 39 arranged to slide loosely upon the clutch member 34 and the projecting end of the sleeve 35. One end of the collar 39 contacts with the face of the adjacent drive wheel and the other is provided with a cam face 40 to coact with the cam member on the sleeve 35. A push rod 41 is swivelly connected with the collar 39 at one end and at its other end is connected to a bell crank 42 pivoted to the transverse bar 26 of the wheel frame. The bell crank is in turn connected to the forwardly projecting portion 15 of the hand lever by means of a link 43 having an elongated loop or slotted depending end.

It will be seen from the foregoing that as the hand lever is moved forwardly to lower the furrow openers, the link 43 acts upon the bell crank 42 to force the push rod rearwardly, and through the swivel connection of said rod with the cam faced collar 39, said collar is rotated a sufficient distance to register the projections and depressions on the adjacent cam faces. The collar, in moving to this position, permits the driving sprockets, and their sleeve carrying the clutch 31, to be moved longitudinally on the axle by the spring 32 a sufficient distance to cause engagement of the clutch members 31 and 34 and thereby the driving sprockets are rotatably locked with the axle 8. In raising the furrow openers the collar 39 is rotated in an opposite direction, and by reason of the beveled arrangement of the contacting cam surfaces, the collar is moved longitudinally on the axle, forcing with it the driving wheels, until it has reached the position shown in Fig. 5, where the clutch members 31 and 34 are disengaged.

It will be noted that the projecting portions on each of the cam members 38 and 40 are so spaced that when registered with the depressions in the adjacent cams, there is considerable rotatable movement permitted on the part of the collar 39, without in any way causing longitudinal movement thereof. By reason of this the furrow openers can be adjusted to different depths within the ground and the clutch members will not be moved relatively. Furthermore, the beveled portions on the cam faces are so restricted that the entire longitudinal movement of the collar takes place during a very brief interval of rotation, and this period should be so timed as to occur after the furrow openers have left the ground and before they reach their maximum position. The rod 41 is adjustable through nuts 44 on the swivel connection, so that the shifting of the clutch members will always take place at the desired time. By having that portion of the quadrant 18 left blank where the lever passes during the shifting of the clutch, it is thereby rendered impossible for the operator to adjust the lever in a position where the clutch members will be but partially engaged, and thus danger of breakage is largely overcome.

An advantage peculiar to my clutch device is that it may be used on both drill and check row planters, as obviously, the driven wheel 29 may be connected direct to the seed shaft, as in drill planters, and in no way change the operation of the clutch tripping mechanism. However, in the present instance, I have shown my device applied to a check row planter wherein the driven wheel is connected to the seed shaft through an intermittent and variable clutch 45 of well-known construction. In this case the check forks which are used to trip the intermittent clutch into and out of action may be operated as the planter is making a turn, but obviously they will perform no function.

As is well known, it is desirable in planters that a wide variation in the speed of the seed shafts be made possible in order to adapt the planter to all kinds of planting conditions. This variation is usually obtained by providing a plurality of drive or driven wheels of varying diameters, as is shown in connection with the drive wheels of the planter illustrated herewith. The sprocket chain may then be shifted from one of the wheels to the other and thus change the speed at which the seed shaft is driven. This makes it necessary to provide some form of tightener for the chain, and I have provided in the present device a tightener that is automatic in operation and capable of accommodating a maximum amount of slack in the chain. This device comprises two rollers 46 and 47 carried on radial arms 48 and 49, which arms mounted on a stub shaft 50 fixed to a bracket 51 on the wheel frame. A double torsional spring 52 is carried on the stub shaft, each having one end anchored to the bracket 51 and the other connected to one of the radial arms. The arms are moved to a position where the spring will yield the desired force upon them and the sprocket chain is passed between the rollers, as shown in Fig. 4. Obviously, under this arrangement the chain can be stretched and the rollers will automatically move to a position where the chain will be in an unbroken line; or, on the other hand, the chain may be loosened and the slack taken up by the rollers to the extent of forming two parallel loops in the chain.

While I have shown and described but one form of my device, it will be understood, nevertheless, that it is capable of many modifications and that changes may be resorted to in the details of the construction without departing from the spirit of my invention as disclosed in the appended claim.

What I claim as my invention, and desire to secure by Letters Patent, is:

In a seed planter, carrying wheels, an axle for said wheels, a carrying frame on said axle, a furrow opener frame hinged to said carrying frame, a double bell crank lever pivoted to said carrying frame having a forwardly extending portion yieldingly connected to the furrow opener frame and a rearwardly extending portion yieldingly connected to the carrying frame, seed dropping mechanism carried on said furrow opener frame, driving means on said axle for operating the seed dropping mechanism, and a connection between the forwardly extending portion of said bell crank lever and said driving means for connecting and disconnecting the driving means from the axle.

In testimony whereof I affix my signature, in the presence of two witnesses.

RALPH L. FORD.

Witnesses:
 EVAN EVANS,
 HERBERT DEKKER